G. E. MOLYNEUX.
SPEED GOVERNED STOPPING MECHANISM.
APPLICATION FILED MAR. 11, 1916.
1,258,926.
Patented Mar. 12, 1918.
3 SHEETS—SHEET 1.
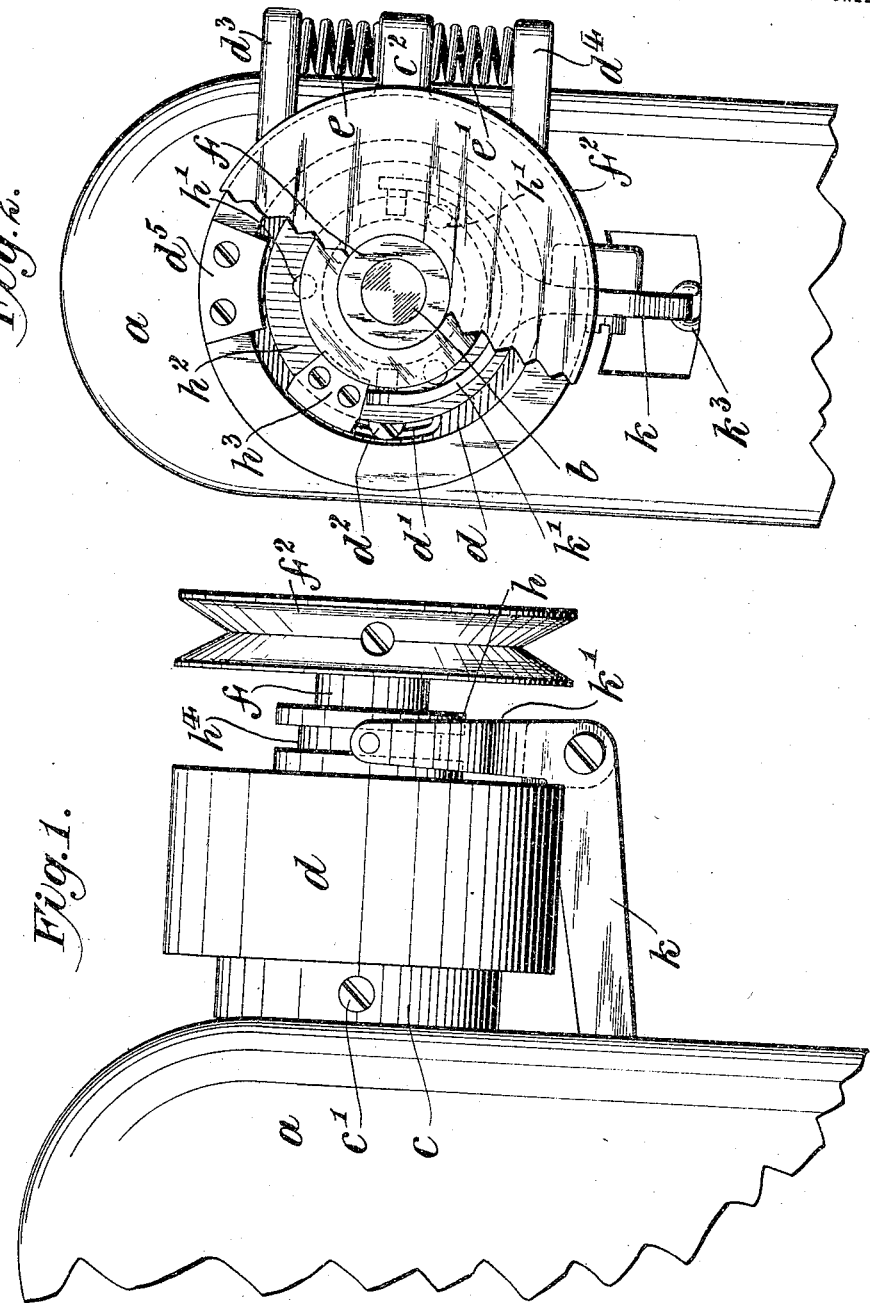

G. E. MOLYNEUX.
SPEED GOVERNED STOPPING MECHANISM.
APPLICATION FILED MAR. 11, 1916.
1,258,926.
Patented Mar. 12, 1918.
3 SHEETS—SHEET 2.
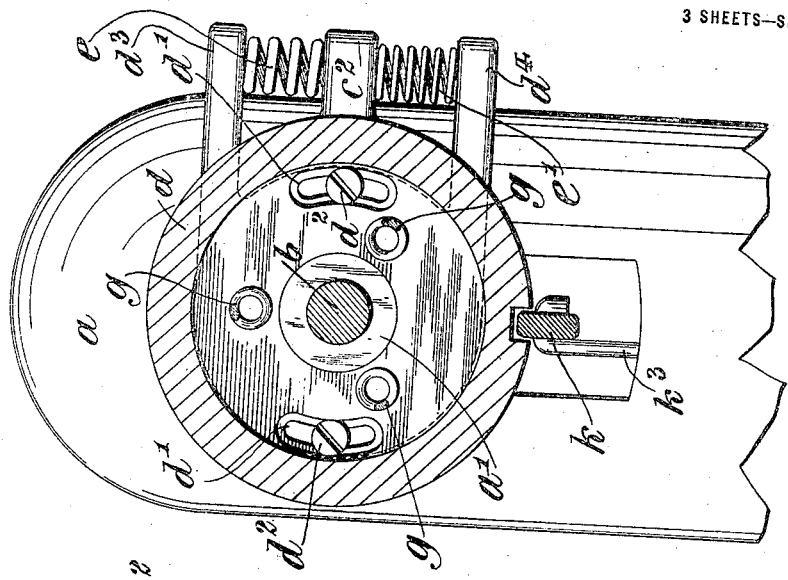
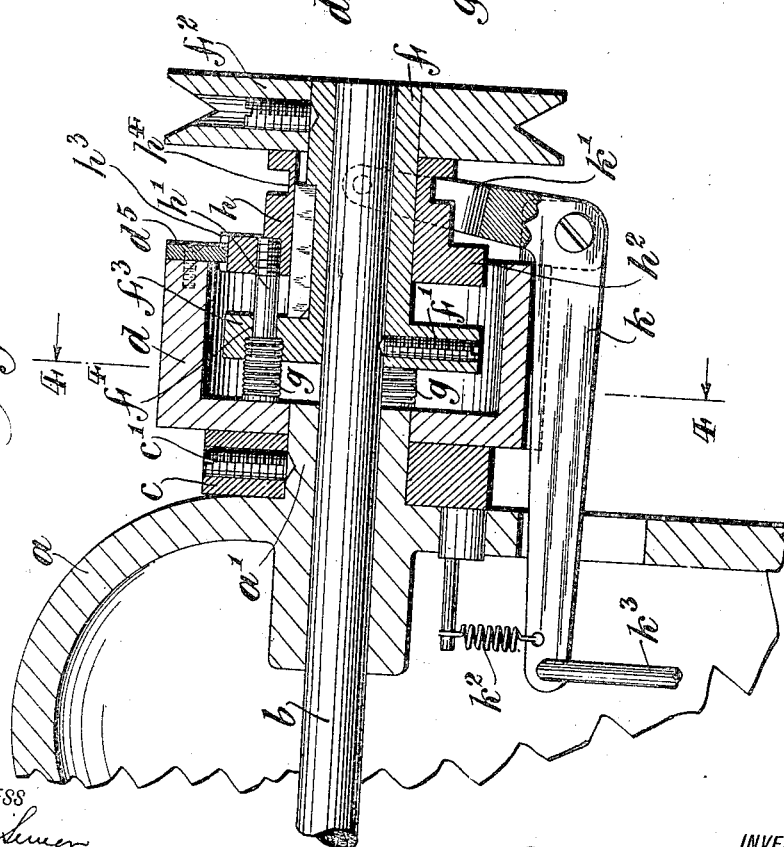

G. E. MOLYNEUX.
SPEED GOVERNED STOPPING MECHANISM.
APPLICATION FILED MAR. 11, 1916.
1,258,926.
Patented Mar. 12, 1918.
3 SHEETS—SHEET 3.
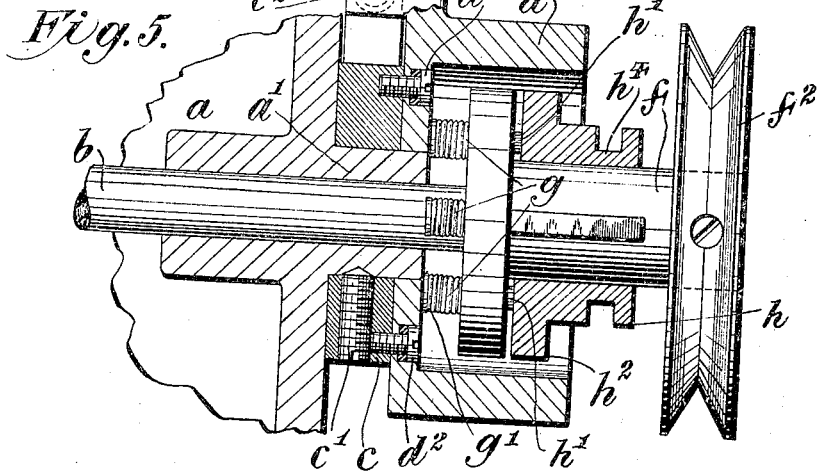
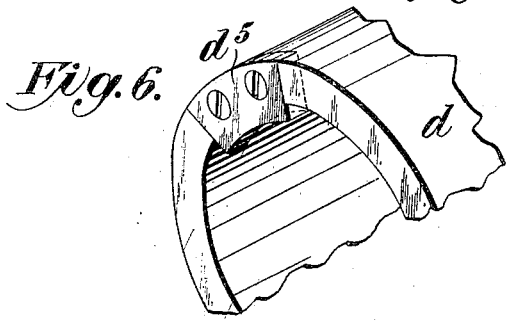
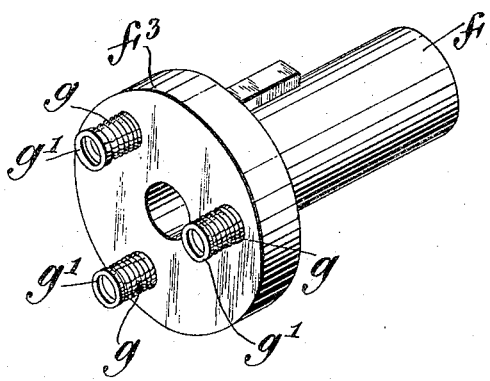
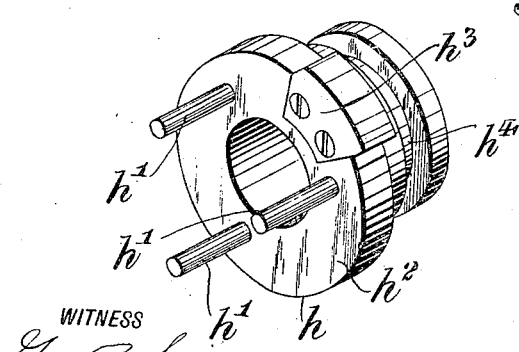
WITNESS
Geo. A. Simon
INVENTOR
George E. Molyneux
BY
Redding, Greeley & Howlett
ATTORNEYS ured to the hub $a'$, as
UNITED STATES PATENT OFFICE.

GEORGE E. MOLYNEUX, OF BAYONNE, NEW JERSEY.

SPEED-GOVERNED STOPPING MECHANISM.

1,258,926.

Specification of Letters Patent. Patented Mar. 12, 1918.

Application filed March 11, 1916. Serial No. 83,604.

*To all whom it may concern:*

Be it known that I, GEORGE E. MOLYNEUX, a citizen of the United States, and residing in the city of Bayonne, county of Hudson, in the State of New Jersey, have invented certain new and useful Improvements in Speed-Governed Stopping Mechanisms, of which the following is a specification, reference being had to the accompanying drawings, forming a part thereof.

Various forms of mechanisms for arresting quickly, but without shock or jar or undue wear, the motion of high speed machines, such as high speed sewing-machines, have been devised heretofore. Such mechanisms, in order that undue shock and breakage of parts may be prevented, are inoperative at normal, high speeds of the shafts to which they are applied and become operative only when the speed of rotation falls below that which has been predetermined as the limit for safe stopping. Most, if not all, of such mechanisms which have had any degree of success in practical use have been dependent upon the centrifugal effect of the varying speed of rotation, embodying in one form or another a body which is capable of radial or substantially radial movement and is maintained, at the normal, high speed of rotation, in its outermost position, moving inward toward the axis of rotation, when the speed falls below the predetermined, normal speed, and then effecting or permitting the engagement of the devices which bring about the stoppage of rotation. The object of this invention is to produce a stopping mechanism of this general character which shall not be dependent in any way upon centrifugal action on a radially movable body, but rather upon friction which, as is well understood, varies with the relative velocity of the bodies in frictional contact. In accordance with the invention there are provided two members one of which is relatively movable and the other of which is relatively stationary, one of such members carrying a gripper which bears frictionally upon the other of such members at high speeds of rotation and is distorted by the frictional engagement between it and the other member sufficiently to grip tightly and prevent movement of a portion of the stopping devices and thereby hold the stopping devices out of operation, but at low speeds resumes its normal shape sufficiently to release such portion of the stopping devices and permit the stopping devices to operate. The invention will be more fully explained hereinafter with reference to the accompanying drawings in which it is illustrated as embodied in a stopping mechanism for a sewing-machine, and in which,—

Figure 1 is a view in front elevation showing a portion of the arm of a sewing-machine with the improved stopping mechanism applied thereto.

Fig. 2 is a view of the same in end elevation, as seen from the right hand in Fig. 1, with a portion of the driving pulley broken away to disclose the parts beyond it.

Fig. 3 is a view of the same parts in longitudinal section, in the stopping position.

Fig. 4 is a view in section on the plane indicated by the line 4—4 of Fig. 3, looking in the direction of the arrow.

Fig. 5 is a partial view similar to Fig. 3 but on a horizontal plane and showing the parts in their driving relation, with the stopping devices held out of operation.

Fig. 6 is a view in perspective showing a portion of the relatively stationary member with its stop-lug.

Fig. 7 is a view in perspective of the relatively movable member with the distortable friction grippers carried thereby.

Fig. 8 is a view in perspective of the rotative member of the stopping devices with its projecting stop-lug and arranged to move longitudinally with respect to the rotatable member and to rotate therewith.

The improved stopping mechanism is shown in the drawings as applied directly to the arm $a$ of an ordinary sewing-machine, such arm having a hub $a'$ which furnishes a bearing for the usual shaft $b$ and also serves, in conjunction with the shaft, as a support for the stopping mechanism, which may be made up as a unit, complete in itself, and applied directly to the arm of a sewing-machine.

There is rigidly secured to the hub $a'$, as by means of set screws $c'$, a ring $c$ which is provided at a suitable point with a radial lug $c^2$. To the ring $c$ is secured frictionally, and so as to be capable of a limited rotary movement, a shell $d$. As shown particularly in Figs. 4 and 5, the shell $d$ may be provided with arc-shaped slots $d'$ through which headed screws $d^2$ are passed into the ring $c$ whereby the shell is held frictionally against the fixed ring $c$ but with capacity for limited rotary movement. On the shell $d$ are formed spring abutments $d^3$ and $d^4$, between which stands the radial lug $c^2$ of the fixed ring $c$. A relatively heavy spring $e$ is interposed between the radial lug $c^2$ and the abutment $d^3$ to cushion the stopping mechanism, and between the abutment $d^3$ and the radial lug $c^2$ is interposed a relatively lighter spring $e'$ to cushion the recoil.

In place of the usual hand wheel and driving pulley, there is rigidly secured to the shaft $b$, as by a set screw $f'$, a sleeve $f$ which carries at one end the driving pulley $f^2$ and at the other end the disklike rotatable member $f^3$. This rotatable member $f^3$ carries one or more distortable grippers $g$ arranged to bear frictionally against the relatively stationary member $d$ and, when distorted by the increase of friction at high speed, to grip and hold against movement the relatively movable member of the stopping devices. As shown in the drawings each of such grippers $g$ is a rather stiff coiled spring which is properly secured to the member $f^3$, being conveniently seated in a recess formed in its face, and may have a wear-plate or shoe $g'$ at its free end to bear against the relatively stationary member $d$. The disklike rotatable member is perforated, as at $f^4$, in line with the interior of each spiral spring gripper.

Keyed on the sleeve $f$, so as to slide thereon and to rotate therewith, is the sleevelike movable member $h$ of the stopping devices, carrying for each coiled spring gripper $g$, a pin $h'$ which has a sliding fit within the coiled spring. The sleeve $h$, having a heavy flange $h^2$, has secured to the flange a projecting stop-lug $h^3$ for coöperation with the relatively stationary stop-lug $d^5$. The sleeve $h$ is also grooved circumferentially as at $h^4$ and is engaged therein by the fork $k'$ of a bell-crank lever $k$ which is acted upon by an adjustable spring $k^2$ to hold the sleeve $h$ normally in its extreme right hand position, as shown in Fig. 3, and is connected by a link $k^3$ with the usual controlling treadle.

Pressure of the operator's foot on the controlling treadle effects, as usual, the coupling of the transmission and at the same time actuates the bell-crank lever $k$ to move the sleeve $h$ or rotatable portion of the stopping devices against the tension of the spring $k^2$ into the position shown in Fig. 5, taking the stop-lug $h^3$ out of the path of the relatively stationary stop-lug $d^5$, so that the machine is free to operate, and at the same time causing the pins $h'$ to enter the coiled spring grippers $g$. So long as the pressure of the operator's foot on the treadle is continued the transmission continues to be coupled and the machine to be driven. As soon as the pressure of the operator's foot is removed from the treadle the transmission is at once uncoupled. The operation of the stopping mechanism, however, does not take place immediately because, at the high speed of operation, the friction between the grippers $g$ and the member $d$ is so great as to distort the grippers sufficiently to cause them to grip the pins $h'$ and prevent the movement of the sleeve into stopping position under the influence of the spring $k^2$. As soon, however, as the speed falls below the predetermined speed at which the stopping mechanism may be permitted to act, the friction between the grippers and the member $d$ is reduced sufficiently to permit the resilience of the spring grippers to straighten out the grippers and therefore to relax their hold on the pins $h'$, so that the sleeve $h$ is then free to be moved by the spring $k^2$, through the bell-crank lever $k$, to place the stop-lug $h^3$ in the same plane with the stop-lug $d^5$ and so bring the machine to rest with the shaft in a predetermined position.

It will be understood that various changes may be made in the details of construction and arrangement to suit different conditions of use and the convenience of the manufacturer without departing from the spirit of the invention.

I claim as my invention:

1. In a stopping mechanism, the combination of a relatively stationary member, a rotatable member, a distortable gripper carried by one of said members and having frictional engagement with the other of said members, and stopping devices including a relatively movable member held normally in inoperative position by distortion of the gripper.

2. In a stopping mechanism, the combination of a relatively stationary member, a rotatable member, a distortable, resilient gripper carried by one of said members and having frictional engagement with the other of said members, and stopping devices including a relatively movable member held normally in inoperative position by distortion of the gripper.

3. In a stopping mechanism, the combination of a relatively stationary member, a rotatable member, a distortable, resilient gripper carried by one of said members and having frictional engagement with the other of said members, and stopping devices including a relatively movable member having a pin for engagement by the gripper and held normally in inoperative position by distortion of the gripper.

4. In a stopping mechanism, the combination of a relatively stationary member, a rotatable member, a distortable, coiled spring gripper carried by one of said members and having frictional engagement with the other of said members, and stopping devices including a relatively movable member having a pin to enter said gripper and to be held therein by distortion of the gripper.

5. In a stopping mechanism, the combination of a relatively stationary member, a rotatable member mounted coaxially therewith, a distortable, coiled spring gripper carried by said rotatable member and having frictional engagement with the relatively stationary member, and stopping devices including a sleeve mounted to rotate with and to move longitudinally with respect to said rotatable member and having a pin to enter said gripper and to be held therein by distortion of the gripper.

6. In a stopping mechanism, the combination of a relatively stationary member, a relatively stationary sleeve having a stop-lug, a rotatable member, a distortable gripper carried by the rotatable member and having frictional engagement with the relatively stationary member, and a sleeve mounted to rotate with and to move longitudinally with respect to the rotatable member, and having a pin to be engaged by the gripper when distorted, and a stop-lug to coöperate with the relatively stationary stop-lug.

7. In a stopping mechanism, the combination of a relatively stationary shell, a rotatable member coaxial therewith, a distortable coiled spring gripper carried by the rotatable member and having frictional engagement with the shell, a sleeve mounted to rotate with and to have longitudinal movement with respect to the rotatable member, a pin carried by said sleeve to enter the coiled spring gripper and to be held therein by distortion of the gripper, a stop-lug carried by the shell, and a stop-lug carried by the sleeve and held out of the plane of the first stop-lug when the pin is engaged by the gripper.

8. In a stopping mechanism, the combination of a relatively stationary member, a relatively rotatable member, and means to hold said members out of operative relation at high speed and including a distortable friction gripping device operative at high speed only.

This specification signed this 10th day of March, A. D. 1916.

GEORGE E. MOLYNEUX.